United States Patent Office 3,552,998
Patented Jan. 5, 1971

1

3,552,998
PROCESS FOR COATING A NONPOROUS SUBSTRATE WITH POLYVINYLIDENE CHLORIDE USING A POLYURETHANE PRECOAT AND PRODUCTS THEREOF
Philip L. Weyna, Crystal Lake, and David A. Frey, Woodstock, Ill., assignors to Morton International, Inc., Chicago, Ill., a corporation of Delaware
No Drawing. Filed Mar. 20, 1968, Ser. No. 714,448
Int. Cl. B32b 27/08; B44d 1/14
U.S. Cl. 117—76                                 8 Claims

ABSTRACT OF THE DISCLOSURE

A method of applying and adhering a film of vinylidene chloride polymers and copolymers to a nonporous substrate, and the product produced thereby. In particular, a method of bonding a film of vinylidene chloride polymer to a nonporous substrate, such as a plastic film or metal foil, and improving the strength of the bond established therebetwen by using a polyurethane precoat as a bonding medium.

BACKGROUND OF THE INVENTION

Field of the invention

The field of this invention is broadly that of flexible packaging materials, and more particularly that of specially coated flexible packaging materials suitable for packaging a variety of foodstuffs to insure their freshness even after long periods of shelf storage in the customary wholesale and retail outlets.

Nonporous films, sheets or substrates, such as polyolefin, nylon, polyester and metal foil, are used widely in the packaging field and other areas. For some purposes many of these materials exhibit an unacceptable permeability to gases, such as oxygen, nitrogen and carbon dioxide, to vaporized solvents, such as alcohols and hydrocarbons, and to the aroma of such substances as perfume, coffee and spices. Furthermore, many of these materials are susceptible to attack by acids, oils and fats.

Description of the prior art

It is generally recognized that the permeability of the above substrates and their susceptibility to attack by acids, oils, and fats, may be greatly reduced by coating them with aqueous plastic dispersions, such as vinylidene chloride copolymer film and coatings. It is known that vinylidene chloride copolymer coatings are excellent barriers to transmission of moisture vapor and gases, and are resistant to attack by a large number of chemicals, such as acids, oils and fats. They also have the added advantage of being heat sealable. These properties make the vinylidene chloride copolymers valuable in the packaging industry as heat sealable, protective barrier coatings.

Vinylidene chloride copolymers can be coated onto selected substrates either from a solvent solution or from an aqueous dispersion. The disadvantages inherent in coating from solvent solution are that an expensive organic solvent is required which is usually toxic and flammable, the expense of the solvent necessitates the installation of a solvent recovery apparatus, and the flammability hazard requires the exercise of extra precautionary measures. These disadvantages are avoided by coating from aqueous dispersions which are generally neither toxic nor flammable and do not require the installation of expensive solvent recovery apparatus.

However, it is well known in the prior art that vinylidene chloride copolymers deposited from aqueous dispersions are not sufficiently adherent to nonporous substrates to provide acceptable packaging materials. At present, emulsions of vinylidene chloride copolymer coatings require the use of an auxiliary adhesion promoter, called a primer or pre-coat, to develop a level of adhesion to nonporous substrates that will be suitable for packaging applications.

Acceptable primers that are currently used are often based on curable two-component (solvent based) systems, which usually have limited pot lives, i.e., they cure and harden upon exposure to air and their use involves flammability and toxicity hazards noted above. Although some polymer latices are used as primers, they require special drying procedures and have failed to provide an adequate bond.

One object, therefore, of this invention is to provide a process for improving the adhesive bond between a nonporous substrate, such as plastic film or metal, and a film of polyvinylidene chloride.

Another object of this invention is to provide a method for the priming of a nonporous substrate before the application of a film of polyvinylidene chloride thereto that will greatly reduce the expensive toxicity and flammability hazards inherent in the use of conventional solvent based primers.

A further object of the present invention is to provide a method for the priming of a nonporous substrate in which the polyvinylidene chloride top coat can be applied after a long time interval between the application of the primer and the application of the polyvinylidene chloride, without a reduction in adhesion of the polyvinylidene chloride to the substrate.

Another object of the present invention is to provide a primer to be used in the application of polyvinylidene chloride to a nonporous substrate, said primer having an unlimited pot life.

A related object of this invention is to provide a polyvinylidene chloride coated nonporous substrate that is characterized by improved adhesion.

SUMMARY OF THE INVENTION

According to the present invention, it has been found that a pre-coat layer of a polyurethane latex, produced by the process hereinafter described, interposed between a nonporous substrate, such as plastic film or metal with a heat sealable polyvinylidene chloride copolymer coating thereon, improves adhesion, heat seal strength, has many process advantages, and provides a packaging material which has excellent barrier properties toward vapor, gases, oils, fats and acids.

Accordingly, in one broad form the foregoing and other objects of this invention are attained by the process of coating a nonporous, flexible, sheet-like substrate with from about 0.1 to about 2.5 pounds dry basis per 3,000 square feet of polyurethane latex, drying said coating, and then coating said polyurethane coating with a coating of vinylidene chloride polymer. Broadly, the polymer (or copolymer) of vinylidene chloride coating is applied in amounts ranging from about 1 pound to about 7 pounds dry basis per 3,000 square feet of said polyurethane coated web.

The polyurethane latex is prepared by the reaction of a diol (or polyhydroxyalcohol) and an organic diisocyanate. Broadly, from 1.2 to 10 moles of diisocyanate are reacted with each mole of diol. The polyurethane latex is disclosed in U.S. 2,968,575.

The use of polyurethane in latex or emulsion form as a primer for coatings of vinylidene chloride copolymers on nonporous substrates obviates the necessity of expensive solvent recovery apparatus and eliminates the exercise of extra precautionary measures due to the flammability and toxicity hazards of solvent based primers.

An additional advantage of the polyurethane primer is that the polyurethane primer of this invention has an extended pot life in contrast to the solvent based primers of the prior art which cure and harden upon exposure to air.

DESCRIPTION OF THE PREFERRED EMBODIMENTS

In a most preferred form of the present invention the the polyurethane latex is applied to the web of the nonporous substrate to provide from about 0.25 to about 1.0 pound dry basis per 3,000 square feet of said web.

The following is a description of the general procedure used to prepare the polyurethane latex used in applicants' invention.

PROCEDURE

Preferably from about 2 to 2½ moles of an organic diisocyanate is reacted with about 1 mole of a diol. About 0.03% by weight of benzoyl chloride based on the diol content may be added to the reaction mixture and the mixture is heated for about four hours at elevated temperatures of ordinarily about 75 to 85° C. The prepolymer formed by this reaction is then dissolved in a minimum of solvent. A water solution containing the emulsifiers sodium lauryl sulfate, sodium dioctylsulfosuccinate and ammonium caseinate is placed in a high speed homogenizer and mixed at high speeds. The temperature of mixing ranges up to 100° C., but preferably from about 10° C. to 25° C. The solvent solution of prepolymer is added rapidly to the water emulsifier solution to form a latex. Prepolymer chain extenders may be added at this point. The latex thus formed is stirred with cooling for several hours (ice bath preferred). The latex is then heated to about 70° C. with continuous stirring for about 1½ hours. The latex is then cooled to room temperature, filtered, and placed in storage containers.

The diols utilized in the above procedure can be either polyethers or polyesters with a molecular weight of from about 750 to about 5000. The preferred diols are the polyethers polypropylene oxide diols and polyoxypropylene-polyoxyethylene block copolymers with molecular weights from about 1000 to about 4000.

A wide variety of organic diisocyanates, including aromatic, aliphatic, cycloaliphatic and combination of these types, may be useful in the reaction but the preferred compound is toluene diisocyanate used in the ratio of from about 2 to about 2.5 moles of diisocyanate per mole of diol.

The emulsifier may be anionic, nonionic and mixtures of both types used in concentrations of from about 1 to about 10% based on the weight of the prepolymer. The emulsifiers most preferred are mixtures of sodium lauryl sulfate and sodium dioctylsulfosuccinate.

It is preferred to use ammonium caseinate as an emulsion stabilizer in concentrations of up to about 3 parts per hundred parts of prepolymer. Other materials which can be used as stabilizers are polyvinyl alcohol, polyvinyl pyrrolidone.

The solvents used to dissolve the prepolymer can be organic solvents especially aromatic solvents such as toluene, xylene, etc., but can include solvents such as glycol ethers and esters, and ketones, in concentrations of up to 20% based on the total weight of the latex. It is preferred to use toluene as the solvent in a concentration up to about 15%.

The prepolymer chain extenders used in the latex can be primary and secondary aliphatic and aromatic diamines, all of which are well known to the art. Preferred chain extenders are 2 methyl piperazine, toluene diamine, phenylene diamine, piperazine ethylene diamine and hexamethylene diamine.

The solids content of the polyurethane latex prepared by the above procedure can range from about 5 to about 50% with a preferred range of from about 30 to about 50%.

For a more complete understanding of the present invention, reference is made to the following examples:

EXAMPLE 1

Polyurethane latex basd on polypropylene oxide diol

In a 1-liter, 3-necked resin kettle, fitted with a mechanical stirrer, condenser, heating mantle, thermometer and nitrogen sweep was placed 76 g. of toluene diisocyanate. To the stirred toluene diisocyanate was added 400 g. of polypropylene oxide diol with a molecular weight of about 2000, followed by the addition of 3 drops of benzoyl chloride.

The reaction mixture was heated to 75–85° C. with continuous stirring under a nitrogen atmosphere. After heating at 75–85° C., the reaction mixture was cooled to room temperature. The prepolymer was removed from the reaction flask and stored in a metal can under a nitrogen atmosphere.

In a 4-liter vessel were placed 600 ml. of deionized water and 12 g. of ammonium caseinate. This mixture was slowly stirred with a turbine stirrer until the ammonium caseinate dissolved. After the ammonium caseinate dissolved, 120 ml. of a sodium lauryl sulfate solution (10% solids) and 80 ml. of a sodium dioctyl sulfosuccinate solution (5% solids) were added to the solution. This solution was called component B.

In a 1-liter beaker were placed 400 g. of the above polymer and 200 g. of toluene. This mixture was stirred with a stirring rod until a solution was established. The resulting solution was called component A. While stirring component B at maximum speed (approximately 7,500 r.p.m.) with a high speed homogenizer in the 4-liter vessel, component A was added to component B in 15–20 seconds. After the addition of component A, stirring was continued for a total stirring time of 1 minute.

After the latex was established it was transferred to a 3-liter 3-necked, round-bottomed flask, fitted with a water cooling bath, mechanical stirrer, thermometer and condenser. The latex was slowly stirred and cooled at 15–16° C. After 4–5 hours, the latex was stirred at ambient temperature for 4 hours. The latex was removed from the flask, filtered through cheese-cloth and stored in polyethylene bottles. The latex was allowed to stand at room temperature for 4–5 days before being tested.

Evaluation of adhesion promotion of polyurethane latex

Example 1 was measured for adhesion promotion by the cellophane tape test and the heat seal bond test.

Cellophane tape test

In evaluation of adhesion promotion by the cellophane tape method, the substrate is coated with the polyurethane latex using a No. 3 wire wound rod followed by drying under infra-red lamps for approximately one minute. The coated or primed substrate is then top-coated with a polyvinylidene chloride latex using a No. 7 wire wound rod. The coated substrate is again dried under infra-red lamps for about 1 minute. The top coating is then scored in parallel lines about ¼ inch apart by means of a razor blade. A second set of score lines is made to intersect the first set at an angle of 90°. (This technique is termed "cross-hatching" of the coating.) A ¾ inch strip of cellophane tape (#600 Scotch brand cellophane tape manufactured by 3M Company) is applied to the coated film over the "cross-hatched" area. The tape is positioned over the coated surface with thumb pressure. The tape is manually removed rapidly with as much force as can be used in manipulating flexible films. The adhesive side of the tape and the coated substrate are then examined for evidence of coating removal. Any evidence of coating removal is interpreted as adhesion failure.

Constructions prepared from both nylon and aluminum foil primed with polyurethane latex prepared in Example 1 and top coated with polyvinylidene chloride latex passed the cellophane tape test.

Heat seal bond test

In the heat seal bond test, the primed and coated substrate is prepared in the same manner as in the cellophane tape test. The coated substrate is then folded in half and heat sealed in the Sentinel heat sealer at 275–300° F. at one second dwell time and at 20 pounds per square inch (p.s.i.) jaw pressure. The heat sealed sheets are cut at right angles to the weld into one inch wide strips. The samples are then tested for bond strength by means of the Instron tensile tester.

An Instron tensile tester is a device used in the packaging industry to determine bond strengths of various flexible wrapping laminates. This apparatus is equipped with a pair of clamps or jaws, one of which jaws is designed to grip one portion of the laminate and the other jaw the other portion. The lower jaw of the Instron tester is connected to a moving cross-head which is driven away from the upper jaw at a constant rate of speed. The upper jaw is connected to an electronic device which detects and records the load applied in units of weight and the force required to break a particular bond. The free ends of the samples are clamped in the Instron tensile tester and drawn apart at the rate of ten inches per minute. The force necessary to pull apart the specimens is then determined. The bond strengths are determined in units of grams per linear inch of weld.

Heat seal bond strengths for constructions prepared from nylon and aluminum foil primed with the polyurethane latex prepared in Example 1 and top coated with polyvinylidene chloride were 640 grams per linear inch and 540 grams per linear inch respectively. A bond strength of about 300 grams per inch or more is considered satisfactory.

EXAMPLE 2

Polyurethane latex based on polyethylene oxide-polypropylene oxide copolymer diol The procedure used to prepare the polyurethane latex is the same as the procedure used in Example 1 except that the diol used and material balances differ as follows:

40.2 g. of toluene diisocyanate
400 g. of polyethylene oxide-polypropylene oxide copolymer diol (molecular weight 3800) sold under the trade name of "Pluronic L-101"
3 drops of benzoyl chloride Constructions prepared from polypropylene primed with the polyurethane latex prepared in Example 2 and top coated with polyvinylidene chloride latex passed the cellophane tape test and exhibited heat seal bonds of 396 g. per linear inch.

EXAMPLE 3

Polyurethane latex based on the polyethylene oxidepolypropylene oxide diol

The procedure used to prepare the polyurethane latex of Example 3 is identical to that described in Example 1 except that the diols used and the material balances were different. The charge used is indicated as follows:

1230 g. of toluene diisocyanate
6825 g. of polyethylene oxide-propylene oxide copolymer diol (molecular weight 2000)—trade name "Pluronic L-61"
3 drops of benzoyl chloride Constructions prepared from polyethylene-Kraft paper, nylon, polypropylene film, and aluminum foil primed with the polyurethane latex of Example 3 and top coated with polyvinylidene chloride latex all passed the cellophane tape adhesion test and exhibited immediate heat seal bond strengths of 417, 1060, 525, 314 and 634 grams per linear inch respectively.

EXAMPLE 4

Polyurethane latex based on the polyethylene oxide-polypropylene oxide diol and chain-extended with a diamine Using the procedure described in Example 1, the prepolymer from a Pluronic L-61 diol. The materials and amounts used to prepare the prepolymer are indicated as follows:

72.1 g. of toluene diisocyanate
400 g. of polyethylene oxide-polypropylene oxide copolymer diol (molecular weight 2000)—trade name "Pluronic L-61"
3 drops of benzoyl chloride The prepolymer was then emulsified using the same procedure as described above but after the addition of the prepolymer to component B, a solution of 2-methyl piperazine was rapidly added to the mixture. This latex was then handled in exactly the same way as described above.

Constructions prepared from polyethylene, nylon, Mylar (polyester) and cellulose butyrate primed with the polyurethane latex prepared in Example 4 and top coated with polyvinylidene chloride latex all passed the cellophane tape test.

Example 5

Polyurethane latex of Example 5 was prepared using "Pluronic L-61" diol and substituting the solvent methyl ethyl ketone for toluene.

Constructions prepared from nylon, polyethylene-kraft paper, and aluminum foil primed with the polyurethane latex of Example 5 and top coated with polyvinylidene chloride all passed the cellophane tape adhesion test and gave immediate heat seal bond strengths of 519, 663 and 794 grams per linear inch respectively.

Several particular embodiments of this invention are shown above. It will be understood, of course, that the invention is not to be limited thereto, since many modifications may be made, and it is contemplated, therefore, by the appended claims to cover any such modifications as fall within the spirit and scope of this invention.

What is claimed is:

1. The process of applying a vinylidene chloride copolymer film to a flexible non-porous sheet-like substrate to provide an improved copolymer coated product, comprising:
   (I) coating the flexible non-porous sheet-like substrate with a latex composition consisting essentially of a polyurethane to provide a polyurethane latex coating on said substrate of from about 0.1 to about 2.5 pounds dry basis per 3,000 square feet of said substrate,
   (II) drying the polyurethane latex coating,
   (III) coating said dried polyurethane coating with an amount of vinylidene chloride copolymer latex to provide a coating on said dried polyurethane of from about 1 pound to about 7 pounds dry basis of said vinylidene chloride copolymer latex per 3,000 square feet of said polyurethane coated substrate, and (IV) drying said vinylidene chloride copolymer latex coating thus applied.

2. The process of claim 1 wherein the polyurethane latex is applied to said substrate to provide a coating from about 0.25 to about 1.0 pound dry basis per 3,000 square feet of said substrate.

3. The process of claim 1 wherein the polyurethane is formed by the reaction of an organic diisocyanate and a diol.

4. The process of claim 3 wherein the diisocyanate is reacted in an amount of from 1.2 to 10 moles per mole of diol.

5. The process of claim 3 wherein the diisocyanate is reacted in an amount of from 2 to 2.5 moles per mole of diol.

6. The product of the process of claim 1.
7. The product of the process of claim 2.
8. The product of the process of claim 3.

References Cited

UNITED STATES PATENTS

| | | | |
|---|---|---|---|
| 2,968,575 | 1/1961 | Mallonee | 161—190X |
| 3,023,126 | 2/1962 | Underwood et al. | 161—190X |
| 3,158,494 | 11/1964 | Eikvar et al. | 117—76(F)X |

WILLIAM D. MARTIN, Primary Examiner

R. HUSACK, Assistant Examiner

U.S. Cl. X.R.

99—171; 117—75, 138.8; 260—77.5